Jan. 1, 1929.
L. E. JONES
FRUIT WASHER
Filed Oct. 25, 1927
1,697,601
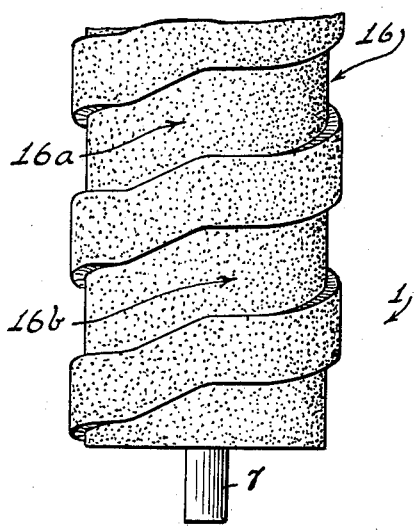
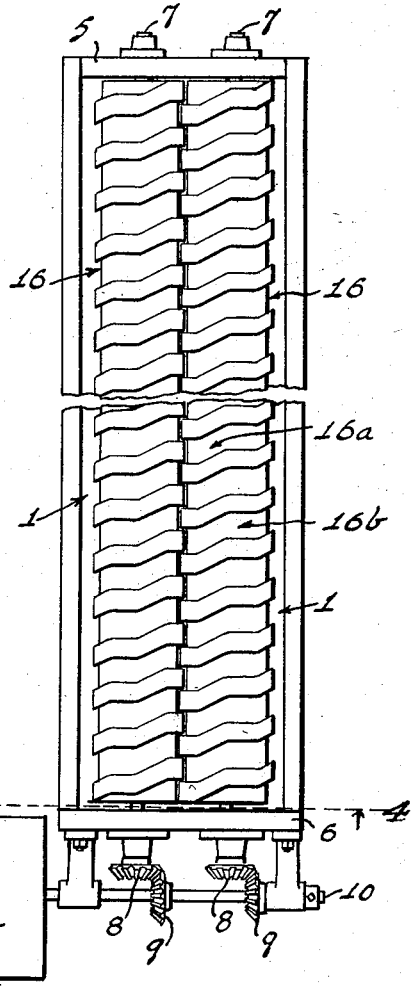
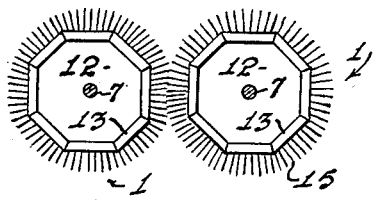
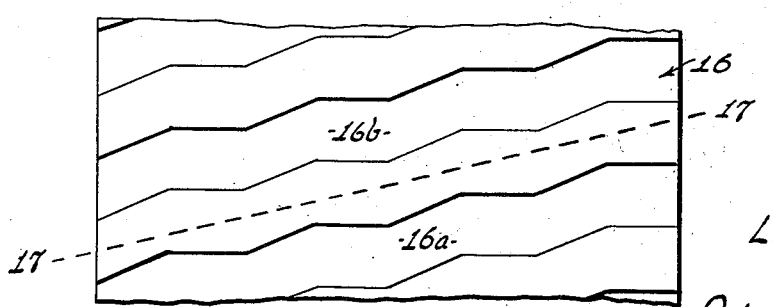
L. E. Jones
Inventor
attorney.

Patented Jan. 1, 1929.

1,697,601

UNITED STATES PATENT OFFICE.

LLOYD E. JONES, OF SANTA MONICA, CALIFORNIA.

FRUIT WASHER.

Application filed October 25, 1927. Serial No. 228,624.

The present invention relates to devices and machines for washing or cleaning fruit, such for instance as the machines employed for cleaning oranges and the like, and the invention pertains more particularly to the rotary brushes employed in such machines.

In apparatus of the class to which this invention pertains a pair of parallel rotary brushes are provided. These brushes are placed in close proximity and are caused to rotate each in the same direction as the other. The brushes provide a fruit conveying trough between them and are each provided with a helical groove. Parts of one brush intermediate the helixes of its groove are caused to extend into the other helical groove so that all portions of the brush are in close proximity to the corresponding portions of the other brush. Rotary movement of the brushes, each in the same direction of rotation as the other, results in the fruit being advanced or conveyed while subject to brushing action.

It is a disadvantage of such machines, however, that the fruit tends to roll through the brushes on a given axis. Usually such axis is along the minor diameter and it often happens that certain parts of the fruit, particularly the stem end and blossom end are not properly acted upon by the brushes. To cause fruit to change its axis of rotation constantly as it advances, various means have been proposed, such means including the use of polygonal rather than round brushes. Such brushes are based on the theory that the constantly changing diameter of the brushes will "up-end" the fruit and cause same to roll around on constantly changing axes. Such brushes, however, have a rather severe agitating action which constantly hurls the fruit from the brush; the fruit thereby often being in the air a great portion of the time rather than in contact with the brushes.

My invention has for its principal object the provision of a set of brushes adapted to constantly change the rolling axis of the fruit without actually tossing it from the brush. Incidentally it is another object of the invention to provide for keeping the fruit, by means of its weight, in contact with the brush as constantly as possible.

Another object of the invention is to carry out the foregoing objects while using a round or cylindrical brush with its attendant well known advantages.

Still another object of the invention is to provide for brushing or cleaning all areas of the fruit equally.

Other objects and advantages of my invention will appear hereinafter and include the proper continued conveying of the fruit through the machine.

I have illustrated by the accompanying drawings one practical embodiment of my invention.

In the said drawings Figure 1 is a plan view of a fragment of a brush constructed in conformity with the salient feature of my invention; it being understood that these brushes are of great length as compared with their diameter.

Figure 2 is a plan view of a machine embodying one or more pairs of the brushes shown in Figure 1;

Figure 3 is a fragmentary surface projection of a brush;

Figure 4 is a view in section seen on a line 4—4 of Fig. 2.

In the machine shown there is provided a suitable frame comprising end members 5 and 6 supporting revolvable parallel shafts 7—7. Each shaft is provided with a bevel gear 8, 8 each driven by a corresponding one of another pair of gears 9, 9. Gears 9, 9 are carried by a drive shaft 10 fitted with a pulley 11. When the pulley is rotated it is obvious that both brush shafts, by means of the gears indicated, will be caused to rotate each in the same direction. The parts just mentioned, or their mechanical equivalents are common to many well known machines and in the drawing I have shown only such parts of the machine as to enable those skilled in the art to apply my improved brushes thereto. Other parts of such machines as means for feeding the fruit to the brushes, means for receiving the fruit after being treated by the brushes, and other means and devices common to such machines are not illustrated and need no description herein.

In the machine illustrated each shaft is provided with an elongated brush 1 such as that shown in Fig. 1 and it is in these brushes that the salient features of my invention reside.

The brushes shown are preferably perfectly circular in outline and it is not essential that the brushes be other than circular. Of course the core 12 of each brush is of polygonal cross section merely because this is common practice and provides for assembling the brushes in parts; the parts being made up of flat brush backs 13 secured by screws 14 to the core 12. When all brush backs are in place, in the manufacture of the complete brush 1, the brush is then turned in a lathe or other suitable machine (not shown) to trim the bristles 15 thereof so as to provide a brush of the desired circular cross section. Each complete brush is therefore in the form of an elongated cylinder.

Each brush is identical to the other and is formed with a groove 16 of suitable width and depth which turns about the cylindrical brush progressively from one end to the other. The path of this groove I term an "imperfect helix" inasmuch as it does not follow the path of a true helix. To more fully illustrate the path of this groove I have shown in Figure 3 a surface projection of the brush. A true helix when developed on a flat surface follows a path which crosses a plane surface on an oblique straight line; such path being indicated by the broken line 17 in Figure 3. A line (not shown) which crosses the projected surface of a cylinder at true right angle to the longitudinal axis of the cylinder would merely be a circumferential line.

In conformity with a salient feature of my invention the groove 16 in the brushes 1, 1, follows a path which is an "imperfect helix", but only portions 16ª of this groove follow the true helical path; the other 16ᵇ portions being disposed so as to follow a practically circumferential path. Thus, viewing the projected surface of the brush the groove alternately changes from a path at right angle to the longitudinal axis of the brush to a path extending at an angle other than right angular.

It is not essential that the groove portions 16ᵇ extend at a true right angle to the portions 16ª but it is essential that the angle or "helical pitch" of the portions 16ª be different from those of portions 16ᵇ.

As will be understood from knowledge of other machines fruit may repose between the two rollers and as the rollers are revolved coordinately the fruit will be advanced through the conveying runway formed by the two brushes. To bring the brushes into close mesh and to properly convey the fruit the portions of one brush intermediate the grooves is disposed in the groove of the corresponding brush, this being common practice for brushes having true helical grooves.

Considering the operation of a machine embodying my improved brushes; as the fruit advances its rate of advance changes by reason of the changing helical pitch of the imperfectly helical groove. Thus; while the fruit is partially reposing in a portion 16ª of a groove it will be advancing at a given rate but when it is partially reposing in a portion 16ᵇ of a groove there is less advance impetus imparted to it. Thus its rate of motion is continually being alternately accelerated and impeded and it is constantly being acted upon by forces applied at differing angles. The result is that the fruit is constantly being "up-ended" so that it changes from one axis of rotation to another axis of rotation to subject all areas of its spherical surface to the action of brush. More uniform brush action is thereby assured while the fruit has a tendency to remain at all times in contact with some of the bristles of either one or both brushes.

It will be apparent now that I have provided brushes which will coact to convey fruit while subjecting them to forces from constantly changing angles to constantly turn the fruit so that the stem, the blossom end, and all intermediate surfaces of the spherical fruit are periodically subjected to the action of the brushes.

While I have shown and described a specific embodiment of my invention and have shown a specific form of brush applied to a specifically described machine, I do not limit myself to any given machine but desire to claim that any machine embodying my improved brush or brushes will come within the scope of my invention, and the brushes as set forth in the appended claims may be applied to any machine whatsoever without enlarging the scope of my invention as set forth in the appended claims.

Having described a practical embodiment of my invention, that which I claim as new and patentable is:

1. As an article of manufacture a substantially cylindrical brush having its brushing surface provided with a groove extending convolutely about said brush surface progressively in a generally helical path; alternate extents of said groove following a given helical pitch and other extents of said groove following a path having a pitch other than the pitch of the first named extents.

2. As an article of manufacture, a substantially cylindrical revoluble brush having its brushing surface provided with a groove following a generally helical path; short extents of said groove following a path helical to the axis of rotation of the brush and intermediate short extents of said groove following a path normally circumferential to said axis of rotation.

3. In a machine of the class described a pair of revoluble brushes axially parallel to each other and forming a fruit conveying trough, each brush having its brushing surface provided with a groove extending convolutely about said brush surface progressively in a generally helical path; alternate extents of said groove following a given helical pitch and other extents of said groove following a path having a pitch other than the pitch of the first named extents; the brush surface of one brush intermediate its groove extended into the groove of the other brush.

4. In a machine of the class described a pair of revoluble brushes axially parallel to each other and forming a fruit conveying trough, each brush having its brushing surface provided with a groove following a generally helical path; short extents of said groove following a path helical to the axis of rotation of the brush and intermediate short extents of said groove following a path normally circumferential to said axis of rotation; the brush surface of one brush intermediate its groove extended into the groove of the other brush.

LLOYD E. JONES.